United States Patent [19]
Giddings et al.

[11] 4,431,760
[45] Feb. 14, 1984

[54] ESTERS AS PROCESSING AIDS FOR MALEIC ANHYDRIDE RESINS

[75] Inventors: Brandford E. Giddings, Shaker Heights; Richard J. Jorkasky, II, Bedford, both of Ohio

[73] Assignee: Standard Oil Company, Cleveland, Ohio

[21] Appl. No.: 357,227

[22] Filed: Mar. 11, 1982

Related U.S. Application Data

[63] Continuation of Ser. No. 150,020, May 15, 1980, abandoned.

[51] Int. Cl.³ .......................... C08K 5/05; C08K 5/10; C08K 5/12
[52] U.S. Cl. .................................... 524/171; 524/289; 524/291; 524/293; 524/295; 524/296; 524/314; 524/549
[58] Field of Search ............... 524/314, 549, 171, 289, 524/296, 291, 293, 295

[56] References Cited

U.S. PATENT DOCUMENTS

| | | | |
|---|---|---|---|
| 2,306,071 | 12/1942 | McNally et al. | 260/31.2 A X |
| 2,361,019 | 10/1944 | Gerhart | 260/31.6 |
| 2,697,087 | 12/1954 | Hetzel | 260/31.6 |
| 2,757,157 | 7/1956 | Hetzel | 260/31.6 |
| 2,873,200 | 2/1959 | Greenlee | 260/31.2 A X |
| 2,875,168 | 2/1959 | Smith et al. | 260/31.6 |
| 2,975,152 | 3/1961 | Hurwitz et al. | 260/31.6 |
| 3,205,270 | 9/1965 | Jaruzelski et al. | 260/31.6 |
| 3,249,574 | 5/1966 | Meyer | 260/31.6 |
| 3,493,412 | 2/1970 | Johnston et al. | 260/31.6 |
| 3,515,630 | 6/1970 | Columbus et al. | 260/31.6 |

Primary Examiner—John C. Bleutge
Assistant Examiner—Herbert J. Lilling
Attorney, Agent, or Firm—Debra L. Pawl; Larry W. Evans; David J. Untener

[57] ABSTRACT

It has been found that the addition of small amounts of a benzoate or acetate ester of a polyfunctional hydroxy-containing compound to a maleic anhydride-containing resin greatly increases the flowability and processibility of these resins.

8 Claims, No Drawings

ESTERS AS PROCESSING AIDS FOR MALEIC ANHYDRIDE RESINS

This is a continuation of application Ser. No. 150,020 filed May 15, 1980, now abandoned.

This invention relates to improvements in the flow rate and processibility of thermoplastic resins containing maleic anhydride and particularly pertains to readily flowable thermoplastic styrene-maleic anhydride copolymer compositions which contain small amounts of a benzoate or acetate ester of a polyfunctional hydroxy-containing compound. These esters serve as internal lubricants.

Maleic anhydride copolymers, especially those containing high levels of maleic anhydride, are very difficult to process. Because these resins are difficult to process, they have been of limited commercial importance. Many attempts have been made to find processing aids which can be used to improve the flow rate of these copolymers. However, very few processing aids have been found to be effective in this system.

According to our invention, it has been discovered that a benzoate or acetate ester of a polyfunctional hydroxy-containing compound has been found to greatly increase the processibility of maleic anhydride resins. These esters are dispersed in a weight ratio within the range of from about 1 to 20 parts by weight and preferably from about 2 to 10 parts by weight based on 100 parts by weight of the maleic anhydride resin to form easily flowable thermoplastic compositions.

The polymeric compositions of the present invention can be prepared by any of the known general techniques of polymerization, including the bulk polymerization, solution polymerization and suspension polymerization techniques by batch, continuous or intermittant addition of the monomers and other components. A preferred method is solution polymerization in an organic solvent in the presence of a free radical initiator and in the substantial absence of molecular oxygen at a temperature of from about 0° C. to 100° C. Suitable solvents include methyl ethyl ketone, acetone, acetonitrile, toluene and benzene. The most preferred solvent is methyl ethyl ketone.

The maleic anhydride copolymers useful in this invention comprise maleic anhydride and a monomer copolymerizable therewith. Maleic anhydride monomers include maleic anhydride, monochloromaleic anhydride and bromomaleic anhydride. The amount of maleic anhydride type monomer can vary widely from about 6% to 50% (molar percent) based on the total polymer composition. Preferably, the instant copolymers contain 40% to 50% maleic anhydride.

The monomers copolymerizable with maleic anhydride include one or more of indene, isobutylene, diisobutylene, styrene, acrylates such as methyl acrylate and methyl methacrylate, alpha-olefins and vinyl acetate. The preferred copolymer is styrene/maleic anhydride wherein up to 80% of the styrene can be replaced by one or more of the monomers listed above. Especially preferred copolymers are styrene/maleic anhydride (1:1 molar ratio) and styrene/maleic anhydride/isobutylene (0.5:1:0.5 molar ratio).

A benzoate or acetate ester of a polyfunctional hydroxy-containing compound has been found to be useful as a lubricant, i.e. processing aid, for the above maleic anhydride containing results. This ester can be formed by adding either benzoic acid chloride or acetic anhydride to a polyfunctional hydroxy-containing compound. The polyfunctional hydroxy-containing compound is a compound which contains at least two hydroxy groups. Preferred are the diols, which contain two hydroxy groups per compound. Examples of these lubricants include the benzoate and acetate esters of hydroquinone, resorcinol, o,o'-biphenol, ethylene glycol, pentaerythritol and 2-butene-1,4-diol.

These esters can be dispersed in the maleic anhydride containing resins of this invention in any one of a number of ways which are well known to those skilled in the art. Dispersions can be made in an extruder, an internal mixer such as a Banbury or Brabender, and the dispersions can be made by adding the lubricant to the dispersion or solution. Dispersions can also be made by adding the lubricant to the powdered oil-granular resin in a high speed mixer.

The compositions produced by following the disclosure of the present invention are useful thermoplastic materials which can be molded into containers, pipes, rods, films, sheets, fibers, and the like, to be used for storing and transporting solids, liquid and gases of various types.

This invention is further illustrated in the following examples wherein the amounts of ingredients are expressed in parts by weight unless otherwise indicated.

COMPARATIVE EXAMPLE A

A resin was prepared from 50 parts by weight of styrene, 50 parts by weight of maleic anhydride, 242 parts by weight of methyl ethyl ketone and 0.5 parts by weight of Vazo-64 (azobisisobutyronitrile), a free radical initiator made by DuPont, using the following procedure. A reaction kettle was placed in a heating mantle and equipped with a stirrer and condensor. One-third of the total charge of methyl ethyl ketone and Vazo-64 were added to this kettle. The resulting solution was heated with stirring to 80° C. After a few minutes, the feed, made up by dissolving the styrene and maleic anhydride monomers in the remainder of the methyl ethyl ketone, is pumped continuously into the kettle over 3 hours. The remaining Vazo-64 is added in two equal amounts to the reaction mixture during the monomer addition. The first Vazo-64 addition is made after 1 hour into the run and, the second, after 2 hours. On completion of the feed addition, the reaction mixture is heated and stirred for an extra hour. After cooling to room temperature, the mixture is worked up by pouring into an excess of methanol or H$_2$O (approximately 3 to 1) in a Waring Blendor. The product obtained is filtered and vacuum oven dried. The resinous product, when Brabendered at 240° C., gave a 12 minute torque of 3,000 meter grams. This product was determined to have a molecular weight of 100,000.

EXAMPLE 1

The procedure of Comparative Example A was repeated using 2.5 gms. of dibenzoate ester of 2-butene-1,4-diol and 47.5 gms. of the styrene/maleic anhydride resin produced above. The resulting mixture, when Brabendered at 240° C., gave a 12 minute torque of 2,050 meter grams.

EXAMPLE 2

The procedure of Example 1 was repeated using 10 gms. of the dibenzoate ester of 2-butene-1,4-diol and 40 gms. of the styrene/maleic anhydride resin. The resulting mixture, when Brabendered at 240° C., gave a 12 minute torque of 440 meter grams.

EXAMPLE 3

The procedure of Example 1 was repeated using 5 gms. of the dibenzoate ester of 1,4-butane-diol and 45 gms. of the styrene/maleic anhydride resin. The resulting mixture, when Brabendered at 240° C., gave a 12 minute torque of 900 meter grams.

EXAMPLE 4

The procedure of Example 1 was repeated except that 2.5 gms. of the dibenzoate ester of ethylene glycol and 47.5 gms. of the styrene/maleic anhydride resin were used. This blend was Brabendered for 12 minutes at 240° C. and a torque of 1,460 meter grams resulted.

COMPARATIVE EXAMPLE B

A resin was prepared from 25 parts of styrene, 50 parts of maleic anhydride, 25 parts of isobutylene, 242 parts of methyl ethyl ketone and 0.3 parts of Vazo-64 using the following procedure. A pressure reactor was placed in a heating mantle and equipped with a stirrer and condensor. The isobutylene, one-third of the total charge of methyl ethyl ketone and one-half of the total charge of styrene was added to the kettle. The resulting solution was heated with stirring to 70° C. After a few minutes, the feed, made up by dissolving the maleic anhydride monomer and Vazo-64 in the remainder of the styrene and methyl ethyl ketone, was pumped continuously into the kettle over 4 hours. On completion of the feed addition, the reaction mixture is post-cooked for an extra 30 minutes. After cooling to room temperature, the mixture is worked up by pouring into an excess of methanol (approximately 3 to 1) in a Waring Blendor. The product obtained is filtered and vacuum oven dried. The final polymer composition was 24 parts styrene, 46 parts maleic anhydride and 30 parts isobutylene.

The resulting polymer was added to a Brabender Plasticorder set at 240° C. and 35 rpm. The 12 minute torque reading was 3,330 meter grams.

EXAMPLE 5

The procedure of Example 1 was repeated using 2.5 gms. of the dibenzoate ester of ethylene glycol and 47.5 gms. of the styrene/maleic anhydride/isobutylene resin produced above. The resulting mixture, when Brabendered at 240° C., gave a 12 minute torque of 1,820 meter grams.

COMPARATIVE EXAMPLE C

The procedure of Comparative Example A was repeated to produce a styrene-maleic anhydride resin having a composition of 50 styrene/50 maleic anhydride (mole percent). This material, when Brabendered at 240° C., gave a 12 minute torque reading of 4,000 meter grams. This resin was determined to have a molecular weight of 133,000.

COMPARATIVE EXAMPLE D

The procedure of Example 1 was repeated using 2.5 gms. of dioctyl phthalate and 47.5 gms. of the styrene/maleic anhydride resin produced in Comparative Example C. Dioctyl phthalate is a common, easily available processing aid for many polymers and was chosen for these reasons to be used as a basis of comparison for acetate esters.

The mixture of styrene/maleic anhydride and dioctyl phthalate, when Brabendered at 240° C., gave a 12 minute torque of 2,640 meter grams.

EXAMPLES 6 THRU 12

The procedure of Example 1 was repeated using 2.5 gms. of an acetate ester of a polyfunctional hydroxy-containing compound and 47.5 gms. of the styrene maleic anhydride resin produced in Comparative Example C. These mixtures were Brabendered at 240° C. for 12 minutes. The results are shown in Table I.

TABLE I

| Example | Brabender Torque | Percent Improvement | Acetate Ester Of |
|---|---|---|---|
| Comp. Ex. A | 4,000 | — | — |
| Comp. Ex. B | 2,640 | 34 | Dioctyl phthalate |
| Ex. 6 | 2,200 | 45 | Bisphenol A |
| Ex. 7 | 2,560 | 36 | Sulfphonyldiphenol |
| Ex. 8 | 2,120 | 47 | 4,4' Thiodiphenol |
| Ex. 9 | 1,830 | 54 | Hydroquinone |
| Ex. 10 | 1,900 | 53 | Resorcinol |
| Ex. 11 | 1,660 | 59 | Pentaerythritol |
| Ex. 12 | 1,720 | 57 | o,o'-biphenol |

Although only a few embodiments of this invention have been specifically described above, it should be appreciated that many additions and modifications can be made without departing from the spirit and scope of the invention. These and all other modifications are intended to be included within the scope of this invention, which is to be limited only by the following claims.

We claim:

1. A thermoplastic composition which comprises a blend of:
   (1) a copolymer of maleic anhydride comprising maleic anhydride and a monomer copolymerizable therewith, and
   (2) from 1–20 parts by weight of a lubricant dispersed in the copolymer wherein said lubricant is selected from the group consisting of the acetate ester of bisphenol A, sulphonyldiphenol, 4,4'-thiodiphenol, hydroquinone, resorcinol and o,o'-biphenol.

2. The composition of claim 1 wherein the copolymer contains 6% to 50% maleic anhydride.

3. The composition of claim 1 wherein the copolymer contains 40% to 50% maleic anhydride.

4. The composition of claim 1 wherein the monomer copolymerizable therewith includes at least one monomer selected from the group consisting of indene, isobutylene, diisobutylene, styrene, methyl acrylate, methyl methacrylate and vinyl acetate.

5. The composition of claim 1 wherein the copolymer comprises a styrene/maleic anhydride copolymer.

6. The composition of claim 5 wherein 50 to 94 mole percent of the copolymer comprises styrene.

7. The composition of claim 6 wherein up to 80% of the styrene is replaced by isobutylene.

8. The composition of claim 1 wherein the lubricant is selected from the group consisting of hydroquinone and resorcinol.

* * * * *